April 22, 1969     KATSUSHIRO FUJITA     3,440,508
SPEED CONTROL SYSTEM FOR A HYSTERESIS MOTOR
Filed Sept. 29, 1966     Sheet _1_ of 2
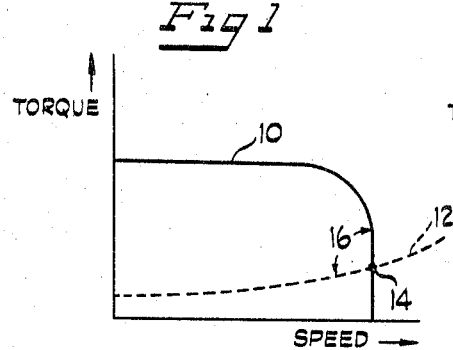
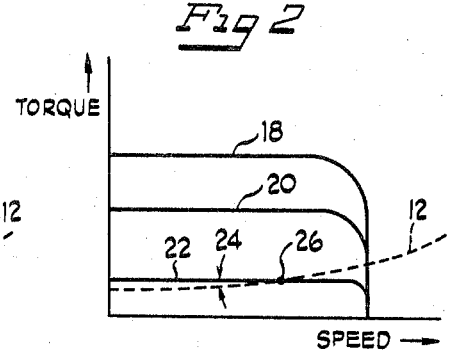
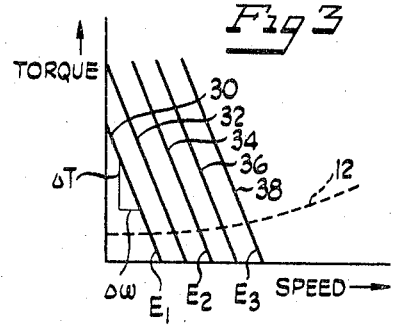
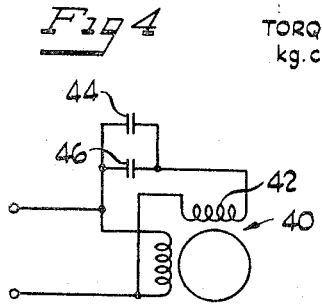
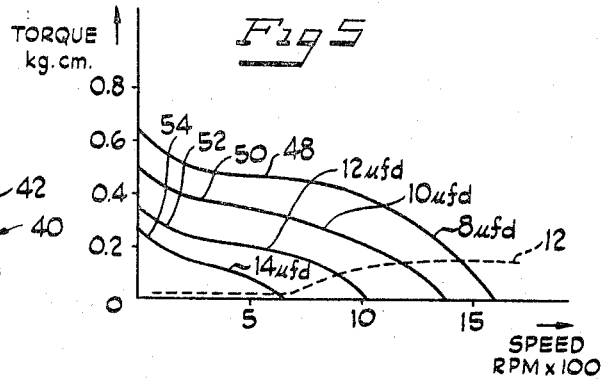
INVENTOR
KATSUSHIRO FUJITA
BY
ATTORNEY

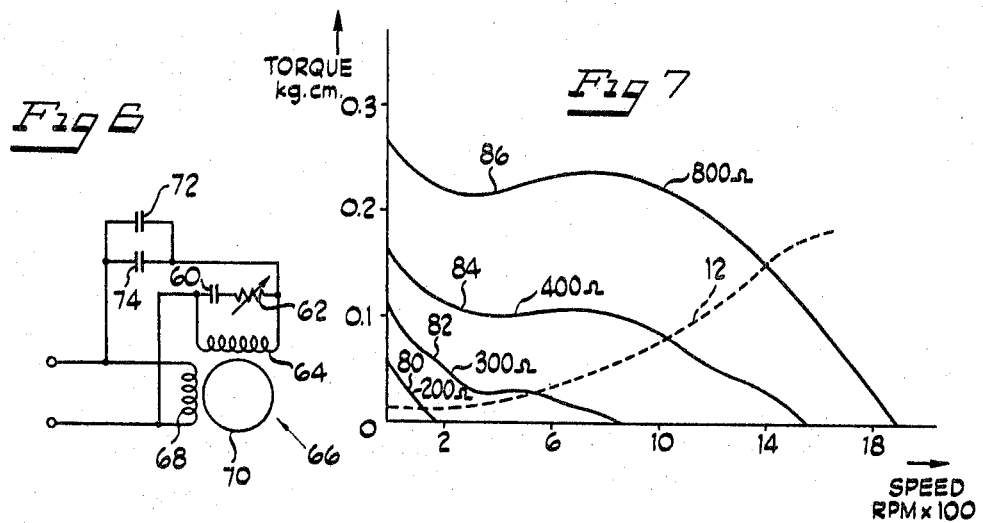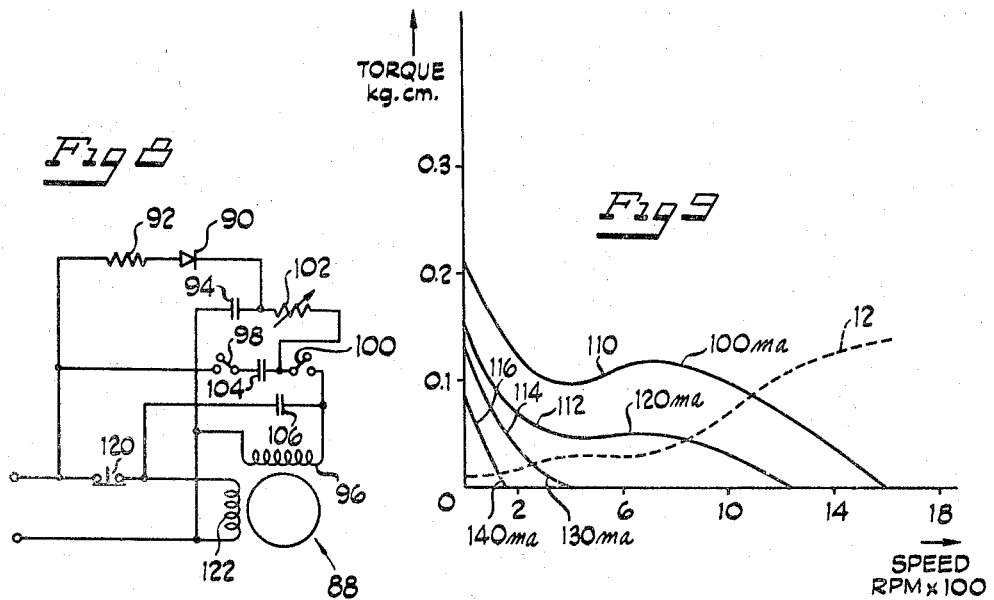

United States Patent Office 3,440,508
Patented Apr. 22, 1969

3,440,508
SPEED CONTROL SYSTEM FOR
A HYSTERESIS MOTOR
Katsushiro Fujita, Tokyo, Japan, assignor to Victor Company of Japan, Limited, Yokohama, Japan
Filed Sept. 28, 1966, Ser. No. 582,585
Claims priority, application Japan, Sept. 30, 1965, 40/59,480
Int. Cl. H02p 5/28, 7/36; H02k 19/02
U.S. Cl. 318—166                                3 Claims

ABSTRACT OF THE DISCLOSURE

The invention provides a system for controlling the speed of a hysteresis motor by controlling the voltage applied to the motor. Heretofore, it has not been possible to so control the speed because it has been difficult to obtain a stabilized low speed revolution. The invention does achieve stability by providing a series circuit containing a capacitor and a variable resistor connected in parallel with an auxiliary winding of a hysteresis motor. A phase-shift capacitor is connected in series with the auxiliary winding. A direct current is supplied to a point between the capacitor and resistor so that the direct current flowing through the auxiliary winding is controlled by said variable resistor.

This invention relates to a speed control system for a hysteresis motor and more particularly to a hysteresis motor control system for regulating the speed of a hysteresis motor used for driving the tape capstan of a magnetic tape video recorder.

Slow-motion replays of pictures recorded on magnetic recording tape may be obtained by decreasing the speed of the tape drive capstan so that the tape playback speed is less than the recording speed. One device for reducing the capstan speed incorporates a speed reduction gear which connects the motor and the capstan. Another device employs a second motor for braking the drive motor in response to control signals. These devices are not satisfactory, for in the first case it is difficult to maintain speed reduction without causing fluctuations in the speed of the capstan, while in the second case, the mechanism is complex and its response is poor.

With the system to be described, a hysteresis motor is used for both regular and low speed drive without incurring the disadvantages of the prior devices. When a slow motion picture is required, the speed of the motor is reduced from synchronous speed throughout a continuous range to zero r.p.m.

A principal object of the invention is to provide a control system for a hysteresis motor which can regulate the speed of the motor over a continuous range from synchronous speed to zero r.p.m.

Another object of the invention is to provide a speed control system for a hysteresis motor which can regulate the speed of the motor continuously over a wide range so that high quality slow motion pictures may be obtained from a magnetic tape, video tape recorder.

A further object of the invention is to provide a speed control system for a hysteresis motor, which has optimum torque-speed characteristics at low speeds.

This invention contemplates other objects, features and advantages which will become more fully apparent from the following detailed description taken in conjunction with the accompanying drawings which illustrate preferred embodiments and in which:

FIG. 1 is a graph showing the torque-speed characteristics of a hysteresis motor; and the torque-speed characteristics of the capstan and load;

FIG. 2 is a graph of the torque-speed characteristics of a hysteresis motor as a function of the excitation voltage shown in relation to the torque-speed characteristic curve of the capstan and the load;

FIG. 3 is a graph of ideal torque-speed characteristics;

FIG. 4 is a circuit diagram of hysteresis motor having an additional phase shift capacitor connected to its auxiliary winding;

FIG. 5 is a graph of the torque-speed characteristics of the motor of FIG. 4 as a function of the value of the additional capacity;

FIG. 6 is a circuit diagram of a control system containing means for varying continuously the speed of the motor;

FIG. 7 is a graph of the torque-speed characteristics of the embodiment shown in FIG. 6 as a function of rheostat resistance;

FIG. 8 is a circuit diagram of a control system containing another means for varying continuously the speed of the rotation; and FIG. 9 is a graph of the torque-speed characteristics of the embodiment shown in FIG. 8 as a function of auxiliary winding direct current.

In FIG. 1, curve 10 describes the torque-speed characteristics of a hysteresis motor which is used as a capstan drive motor. Curve 12 describes the torque-speed characteristics of a capstan connected to the rotary shaft of the motor. In general, as shown in FIG. 1, the speed of the motor is stabilized at a point 14 which is the intersection of the torque-speed curve 10 for the motor and the torque-speed curve 12 for the load. It is difficult to decrease the speed of a hysteresis motor because its relatively constant torque-speed characteristics allow it to synchronize any load it can accelerate.

When only the supply voltage V is varied, a family of torque-speed characteristic curves such as 18, 20 and 22 in FIG. 2 may be generated. These curves show that as supply voltage is lowered from V for curve 18 to V' for curve 20, the maximum torque is also lowered, but the synchronous speed remains constant. At a low voltage V", the angle 24 between the low voltage motor torque-speed curve 22 and the load torque-speed curve 12 at the point of intersection 26 becomes small; an indication of poor system stability. It takes a long time to stabilize the speed, or the speed fluctuates because there is no clearly defined point of intersection for curves 12 and 22.

A family of ideal torque-speed characteristic curves 30, 32, 34, 36 and 38 for a motor which may be used as a capstan drive motor is shown in FIG. 3 wherein each curve has a steep gradient for which $\Delta T$ is an incremental change in the load torque and $\Delta \omega$ is an incremental change in speed. The curves are generated by increasing the applied voltage from $E_1$ to $E_2$ to $E_3$ as indicated in FIG. 3. It is the function of the control system to provide an optimum of torque-speed characteristic for driving a tape capstan at reduced speeds with a hysteresis motor.

One means for increasing the gradient of the torque-speed of a hysteresis motor 40 is to increase the capacity of the phase shift capacitor connected to a motor's auxiliary winding 42 as shown in FIG. 4 where capacitor 44 is added to phase shift capacitor 46. A family of torque-speed curves 48, 50, 52 and 54 which was generated by changing the value of the added capacitance 44 is shown in FIG. 5. Notice that the speed characteristic curves of the motor as shown in FIG. 5 can be made to approximate the characteristic curves of FIG. 3. As shown in FIG. 5, the output torque decreases in proportion to the increase of the value of capacitor 44 so that the increase in the capacity of the capacitor 44 must be limited up to predetermined value. This limitation in turn limits the speed of the system's response to change because the gradient of the torque-speed characteristic curves obtained only by increasing the value of the phase shaft capacitor is small.

In the first embodiment of this invention, as shown in FIG. 6, a series circuit containing a capacitor 60 and a rheostat 62 is connected in parallel with an auxiliary coil 64 of a hysteresis motor 66 having a main winding 68, and rotor 70 and phase shift capacitors 72 and 74. FIG. 7 shows a family of torque-speed characteristic curves 80, 82, 84 and 86 generated by varying the resistance of rheostat 62, from 200 ohms to 800 ohms. When compared with the load torque-speed curve 12, it is apparent that the torque-speed characteristic curves for the motor have a gradient in the low speed range which is sufficient for control purposes.

FIG. 8 shows a second embodiment of this invention for use with motor 88. In this embodiment, diode 90, resistor 92 and capacitor 94 form a source of direct current for auxiliary coil 96. Switching from normal speed to slow motion speed is accomplished by operating switches 98 and 100. When the motor is running at a slower speed, these switches are closed, thereby connecting an additional phase shift capacitor 104 in parallel with phase shift capacitor 106 to the winding 96. The magnitude of the direct current applied to the auxiliary coil 96 is controlled by rheostat 102.

FIG. 9 shows a family of torque-speed characteristic curves 110, 112, 114 and 116 generated by varying the current supplied to the auxiliary coil 96. When compared with the load torque-speed curve 12, it is apparent that the torque-speed characteristic curves for this embodiment also have a gradient in the low speed range which is suitable for control purposes. Accordingly, this system effectively controls the motor so that the required stability and wide variability of speed may be obtained for driving loads such as a tape-drive capstan in magnetic tape video recorder.

The embodiment of FIG. 8 contains another unique feature: a brake. By depressing switch 120, the alternating current circuits of the motor's main winding 122 and auxiliary winding 96 may be opened. When switch 100 is closed, the auxiliary coil 96 is energized only by direct current which causes the motor to develop a retarding or braking torque which may be used to bring its load to rest.

Other embodiments within the spirit and scope of my invention will become apparent to others skilled in this art upon examination of the two systems described above. Accordingly, the scope of the invention should not be interpreted as being limited to the circuits which have been illustrated; but instead, reference should be made to the following claims.

I claim:
1. A speed control system comprising:
 (a) a hysteresis motor having a rotor, a main winding, and an auxiliary winding;
 (b) means for connecting a first terminal of the main winding and a first terminal of the auxiliary winding to a first terminal of an electric power source;
 (c) a first switch;
 (d) a second switch;
 (e) a third switch;
 (f) a resistor;
 (g) means for connecting a first terminal of the first switch, a first terminal of the third switch and a first terminal of the resistor to a second terminal of said electric power source;
 (h) a first capacitor having a first terminal connected to a second terminal of the auxiliary winding and a second terminal connected to a second terminal of the third switch and a second terminal of the main winding;
 (i) a second capacitor having a first terminal connected to a first terminal of the second switch and a second terminal connected to a second terminal of the first switch;
 (j) means for connecting a second terminal of the second switch to the second terminal of the auxiliary winding;
 (k) a third capacitor having a first terminal connected to the first terminal of the main winding;
 (l) a rheostat having a first terminal connected to a second terminal of the third capacitor and a second terminal connected to the first terminals of the second capacitor and the second switch; and
 (m) a diode having a first terminal connected to a second terminal of the resistor and a second terminal connected to the first terminal of the rheostat.

2. A speed control system comprising:
 (a) a hysteresis motor having a rotor, a main winding, and an auxiliary winding;
 (b) a series circuit comprising a capacitor and a resistor, the series circuit being connected in parallel with the auxiliary winding of the motor;
 (c) a phase-shift capacitor connected in series with the auxiliary winding;
 (d) an alternating current power supply for driving said motor; and
 (e) means for decreasing the reactance of the phase-shift capacitor for low speed operation of the motor.

3. A speed control system as defined in claim 2 wherein said resistor is a rheostat, and further comprising in addition:
 (a) a rectifier;
 (b) means including said rectifier coupled to said power supply for supplying direct current at the connecting point between said capacitor and said rheostat in the series circuit; and
 (c) means responsive to a setting of said rheostat for changing the direct current passing through said auxiliary winding.

References Cited

UNITED STATES PATENTS 2,512,665  6/1950  Meredith _____ 318—166 XR
2,586,095  2/1952  Roters _____ 318—166

ORIS L. RADER, *Primary Examiner.*

G. Z. RUBINSON, *Assistant Examiner.*